(12) United States Patent
Imamura et al.

(10) Patent No.: US 9,166,736 B2
(45) Date of Patent: *Oct. 20, 2015

(54) COMMUNICATION APPARATUS AND COMMUNICATION METHOD

(75) Inventors: Daichi Imamura, Osaka (JP); Akihiko Nishio, Osaka (JP); Kenichi Kuri, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 506 days.

This patent is subject to a terminal disclaimer.

(21) Appl. No.: 13/236,189

(22) Filed: Sep. 19, 2011

(65) Prior Publication Data

US 2012/0008517 A1    Jan. 12, 2012

Related U.S. Application Data

(63) Continuation of application No. 12/063,980, filed as application No. PCT/JP2006/316218 on Aug. 18, 2006, now Pat. No. 8,040,912.

(30) Foreign Application Priority Data

Aug. 19, 2005    (JP) ................. 2005-238952

(51) Int. Cl.
*H04J 3/16*    (2006.01)
*H04L 1/00*    (2006.01)
(Continued)

(52) U.S. Cl.
CPC ............ *H04L 1/0026* (2013.01); *H04L 1/0016* (2013.01); *H04L 5/0091* (2013.01);
(Continued)

(58) Field of Classification Search
CPC ... H04L 1/0016; H04L 1/0026; H04L 5/0091; H04L 1/0003; H04L 1/0009; H04L 1/08; H04L 5/0046; H04L 5/006; H04L 5/0007; H04W 28/06; H04W 24/00

USPC .......... 370/437, 203, 208, 238, 343, 344, 468
See application file for complete search history.

(56) References Cited

U.S. PATENT DOCUMENTS 6,760,882 B1 *   7/2004   Gesbert et al. ................. 714/774
7,103,325 B1 *   9/2006   Jia et al. ........................ 455/101
(Continued)

FOREIGN PATENT DOCUMENTS

JP    2003-169036    6/2003
JP    2003-174426    6/2003
(Continued)

OTHER PUBLICATIONS

International Search Report dated Nov. 21, 2006.
(Continued)

*Primary Examiner* — Luat Phung
(74) *Attorney, Agent, or Firm* — Dickinson Wright PLLC

(57) ABSTRACT

Provided is a multicarrier communication apparatus by which information quantity of CQI reporting can be reduced. In the apparatus, each CQI is recorded in a CQI table section (122) by being classified into a plurality of CQI groups by following a certain rule. A CQI selecting section (123) estimates fluctuation range and variance of reception qualities of the entire resource block to be reported, based on an SINR value outputted from a quality level calculating section (121). Then, based on the estimated values, the CQI selecting section selects a suitable CQI group in a first step, selects a suitable CQI value from among the CQIs included in the selected CQI group in a second step, and outputs the ID of the selected CQI group and the selected CQI value to a CQI generating section (124). Based on such information, the CQI generating section (124) generates a CQI frame to be transmitted to a base station.

6 Claims, 19 Drawing Sheets

(51) Int. Cl.
  *H04L 1/08* (2006.01)
  *H04L 5/00* (2006.01)
  *H04W 24/00* (2009.01)
  *H04W 28/06* (2009.01)

(52) U.S. Cl.
  CPC ............ *H04L1/0003* (2013.01); *H04L 1/0009* (2013.01); *H04L 1/08* (2013.01); *H04L 5/006* (2013.01); *H04L 5/0007* (2013.01); *H04L 5/0046* (2013.01); *H04W 24/00* (2013.01); *H04W 28/06* (2013.01)

(56) References Cited

U.S. PATENT DOCUMENTS

| | | | | |
|---|---|---|---|---|
| 7,907,958 | B2* | 3/2011 | Sampath et al. | 455/509 |
| 7,933,287 | B2* | 4/2011 | Toda et al. | 370/437 |
| 2003/0003863 | A1* | 1/2003 | Thielecke et al. | 455/39 |
| 2003/0026353 | A1* | 2/2003 | Chen et al. | 375/316 |
| 2003/0063587 | A1* | 4/2003 | Cho et al. | 370/335 |
| 2004/0027994 | A1* | 2/2004 | Baines | 370/252 |
| 2004/0125743 | A1* | 7/2004 | Hashem et al. | 370/208 |
| 2004/0190486 | A1* | 9/2004 | Oshiba | 370/349 |
| 2005/0003782 | A1* | 1/2005 | Wintzell | 455/226.3 |
| 2005/0025254 | A1* | 2/2005 | Awad et al. | 375/295 |
| 2005/0128993 | A1* | 6/2005 | Yu et al. | 370/342 |
| 2005/0201474 | A1 | 9/2005 | Cho | |
| 2006/0034244 | A1 | 2/2006 | Huang | |
| 2006/0039318 | A1* | 2/2006 | Oh et al. | 370/328 |
| 2006/0179387 | A1* | 8/2006 | Taffin et al. | 714/746 |
| 2006/0221807 | A1* | 10/2006 | Fukuoka et al. | 370/203 |
| 2006/0234643 | A1 | 10/2006 | Kikuchi | |
| 2007/0026810 | A1 | 2/2007 | Love | |
| 2007/0223611 | A1 | 9/2007 | Ode | |
| 2008/0152028 | A1* | 6/2008 | Futaki et al. | 375/260 |
| 2008/0232340 | A1* | 9/2008 | Wan et al. | 370/343 |
| 2009/0141658 | A1 | 6/2009 | Day | |
| 2011/0243027 | A1* | 10/2011 | Duan et al. | 370/252 |
| 2012/0189039 | A1* | 7/2012 | Baines | 375/219 |

FOREIGN PATENT DOCUMENTS

| | | |
|---|---|---|
| JP | 2005-002253 | 1/2005 |
| JP | 2005-160079 | 6/2005 |
| WO | 2005/002253 | 1/2005 |

OTHER PUBLICATIONS

3GPP TSG RAN WG1 Ad Hoc on LTE, contributory document, NTT DoCoMo, "Physical Channels and Mulitplexing in Evolved UTRA Downlink," (R1-050590), Jun. 2005, pp. 1-24, p. 3, line 5.

* cited by examiner

| Index | Modulation | RF | CodeRate | RATE RATIO (WITH RESPECT TO QPSK, RF = 4, R = 1/3) |
|---|---|---|---|---|
| 31 | UNUSED | | | — |
| 30 | 64QAM | 1 | 5/6 | 30.00 |
| 29 | 64QAM | 1 | 3/4 | 27.00 |
| 28 | 64QAM | 1 | 2/3 | 24.00 |
| 27 | 64QAM | 1 | 1/2 | 18.00 |
| 26 | 64QAM | 1 | 1/3 | 12.00 |
| 25 | 16QAM | 1 | 5/6 | 20.00 |
| 24 | 16QAM | 1 | 3/4 | 18.00 |
| 23 | 16QAM | 1 | 2/3 | 16.00 |
| 22 | 16QAM | 1 | 1/2 | 12.00 |
| 21 | 16QAM | 1 | 1/3 | 8.00 |
| 20 | 8PSK | 1 | 5/6 | 15.00 |
| 19 | 8PSK | 1 | 3/4 | 13.50 |
| 18 | 8PSK | 1 | 2/3 | 12.00 |
| 17 | 8PSK | 1 | 1/2 | 9.00 |
| 16 | 8PSK | 1 | 1/3 | 6.00 |
| 15 | QPSK | 1 | 5/6 | 10.00 |
| 14 | QPSK | 1 | 3/4 | 9.00 |
| 13 | QPSK | 1 | 2/3 | 8.00 |
| 12 | QPSK | 1 | 1/2 | 6.00 |
| 11 | QPSK | 1 | 1/3 | 4.00 |
| 10 | QPSK | 2 | 5/6 | 5.00 |
| 9 | QPSK | 2 | 3/4 | 4.50 |
| 8 | QPSK | 2 | 2/3 | 4.00 |
| 7 | QPSK | 2 | 1/2 | 3.00 |
| 6 | QPSK | 2 | 1/3 | 2.00 |
| 5 | QPSK | 4 | 5/6 | 2.50 |
| 4 | QPSK | 4 | 3/4 | 2.25 |
| 3 | QPSK | 4 | 2/3 | 2.00 |
| 2 | QPSK | 4 | 1/2 | 1.50 |
| 1 | QPSK | 4 | 1/3 | 1.00 |
| 0 | COMMUNICATION IS NOT POSSIBLE | | | — |

FIG. 3

COMMUNICATION APPARATUS AND COMMUNICATION METHOD

This is a continuation application of application Ser. No. 12/063,980 filed Feb. 15, 2008, which is a national stage of PCT/JP2006/316218 filed Aug. 18, 2006, which is based on Japanese Application No. 2005-238952 filed Aug. 19, 2005, the entire contents of each which are incorporated by reference herein.

TECHNICAL FIELD

The present invention relates to a multicarrier communication system, multicarrier communication apparatus and CQI report method that adopt a scheme such as an OFDM (Orthogonal Frequency Division Multiplex) scheme.

BACKGROUND ART

To achieve a high system throughput in a communication system using an OFDM scheme, a method is under study whereby subcarriers are divided into a plurality of resource blocks (RB: which refers to a group composed of a plurality of subcarriers and serve as an allocation unit during scheduling) and users are allocated to the resource blocks according to a channel quality indicator (CQI) for each resource block using time-frequency scheduling.

In order to effectively obtain a multi-user diversity gain through time-frequency scheduling, one resource block is set smaller than a correlation bandwidth. On the other hand, when the bandwidth of a resource block becomes small, the number of resource blocks increases. Effective frequency scheduling requires a CQI to be reported on a per resource block basis, and therefore when the number of resource blocks increases, the amount of CQI report (amount of information) increases and the overhead in uplink also becomes large. Furthermore, when the number of communication terminals increases, the proportion of CQI's in an uplink signal also increases. Moreover, M-ary modulation further increases the number of selectable parameters, and therefore the amount of CQI report increases.

For example, Non-Patent Document 1 discloses a technique of reducing the amount of CQI information in uplink by limiting the number of resource blocks (number of RBs) to be reported.

One such method selects N resource blocks in descending order of received quality as resource blocks for which CQI's are to be reported and reports CQI values corresponding to resource block identifiers (RB-ID) which specify those resource blocks. Furthermore, another method puts together a plurality of resource blocks, sets an RB group for CQI report and reports from each communication terminal only CQI's of resource blocks included in the RB group. This limits the number of resource blocks targeted for CQI report, and can thereby reduce the amount of CQI report.

When a transmission rate is relatively low and the number of resource blocks to which data is allocated is small, this technique can effectively reduce the amount of CQI report in uplink for communication terminals to which resource blocks are allocated preferentially without substantially losing a multi-user diversity gain.

Non-Patent Document 1: "Physical Channels and Multiplexing in Evolved UTRA Downlink" (R1-050590), 3GPP TSG-RAN WG1 contributory document, NTT DoCoMo, June 2005

DISCLOSURE OF INVENTION

Problems to be Solved by the Invention

However, the above-described technique requires CQI report on many resource blocks for communication terminals having a relatively high transmission rate and low allocation priority and communication terminals to which resource blocks of good received quality are not always allocated. That is, a communication terminal having a high transmission rate also has a large number of allocated resource blocks and a communication terminal having low allocation priority is likely to be allocated to an idle channel, and therefore the number of resource blocks for which CQI's are reported must be increased. This results in a problem that the effect of reducing the amount of CQI report is lessened.

It is an object of the present invention to reduce the amount of CQI report even when there are communication terminals having a relatively high transmission rate and low allocation priority.

Means for Solving the Problem

The multicarrier communication system according to the present invention that causes a communicating party to report channel quality indicators according to received quality, adopts a configuration in which: the channel quality indicators are divided beforehand into a plurality of groups according to information shown by the channel quality indicators; and a multicarrier communication apparatus selects a group from the plurality of groups according to the received quality, further selects a channel quality indicator from the group according to the received quality and reports group selection information showing the selected group and channel quality indicator selection information showing the selected channel quality indicator.

Advantageous Effect of the Invention

According to the present invention, even when there are communication terminals having a relatively high transmission rate and low allocation priority, the amount of CQI report can be reduced.

BRIEF DESCRIPTION OF DRAWINGS

FIG. 3 shows an example of all CQI's available in the communication system according to Embodiment 1;

BEST MODE FOR CARRYING OUT THE INVENTION

Embodiments of the present invention will be described in detail below with reference to the attached drawings. A case will be described with embodiments here as an example where an OFDM scheme is adopted as multicarrier communication and a communication terminal which communicates with a base station estimates received quality in downlink and reports a CQI as channel quality information to the base station, but the present invention is not limited to this.

Embodiment 1

Figure 1:
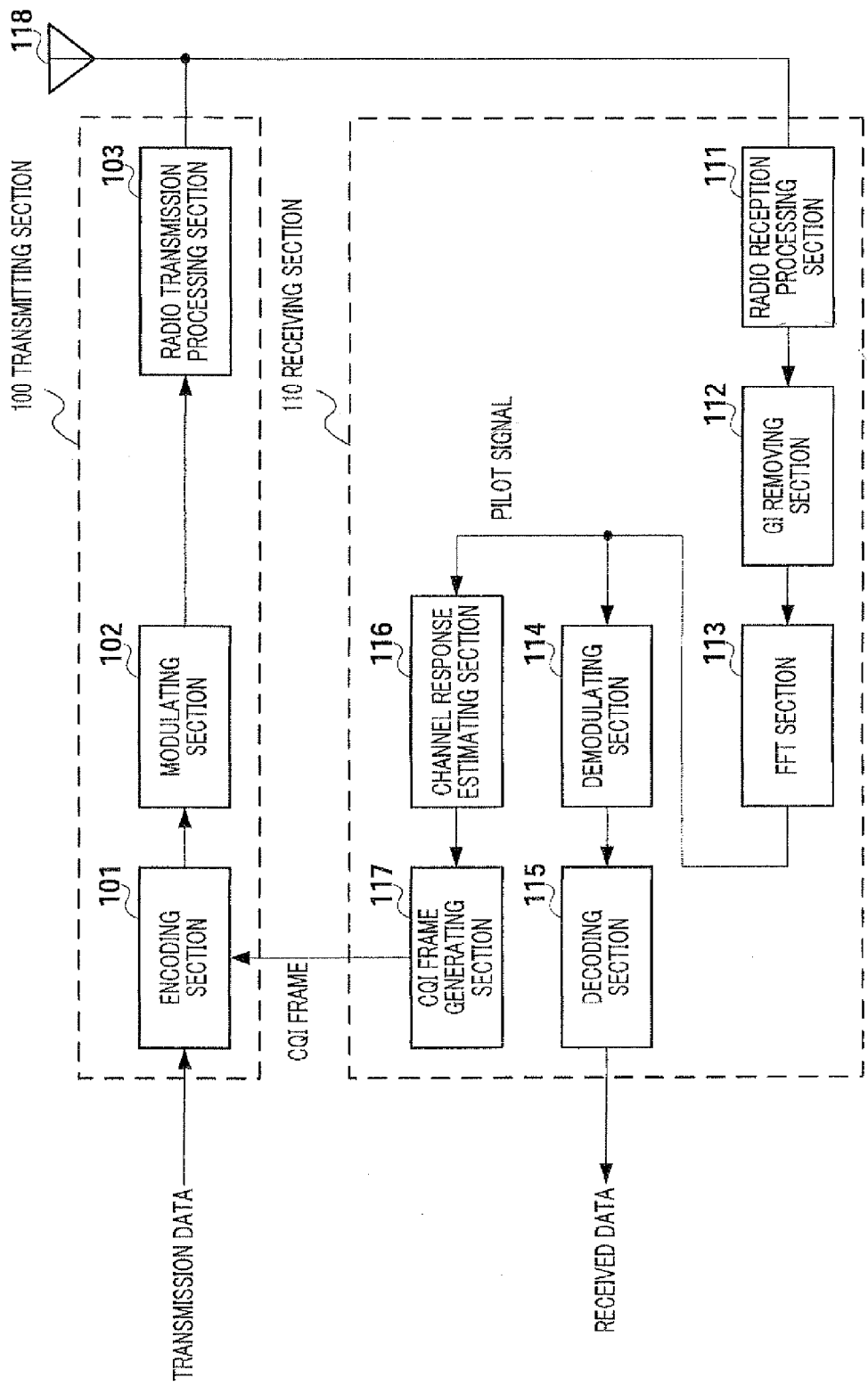
FIG. 1 is a block diagram showing the main configuration of a multicarrier communication apparatus according to Embodiment 1.

FIG. 1 is a block diagram showing the main configuration of a multicarrier communication apparatus (mobile station) according to Embodiment 1 of the present invention.

The multicarrier communication apparatus according to this embodiment has transmitting section 100, receiving section 110 and antenna 118. Furthermore, transmitting section 100 is provided with encoding section 101, modulating section 102, radio transmission processing section 103. Receiving section 110 is provided with radio reception processing section 111, GI removing section 112, FFT section 113, demodulating section 114, decoding section 115, channel response estimating section 116 and CQI frame generating section 117.

The sections of the multicarrier communication apparatus according to this embodiment operate as follows.

In receiving section 110, radio reception processing section 111 receives a signal transmitted from a base station through antenna 118, converts the received signal to a baseband signal and outputs the signal to GI removing section 112. GI removing section 112 removes a guard interval portion from the baseband received signal and outputs this received signal to FFT section 113. FFT section 113 converts the received time domain signal into a frequency domain signal through a fast Fourier transform (FFT) and outputs the result to demodulating section 114 and channel response estimating section 116. Demodulating section 114 performs demodulation processing according to a predetermined modulation scheme such as QPSK and 16QAM on the signal of an information data sequence from which pilot signals and the like are removed, out of the received signal subjected to fast Fourier transform processing, and outputs the demodulated signal to decoding section 115. Decoding section 115 performs error correcting processing according to a predetermined coding scheme such as turbo code on the signal from which pilot signals and the like are removed, and extracts received data which is the information data sequence, from the received signal.

Furthermore, channel response estimating section 116 receives a signal, such as a pilot signal, necessary for channel response estimation out of the received signal subjected to the fast Fourier transform processing and estimates a channel response on a per subcarrier basis. CQI frame generating section 117 generates a CQI frame for CQI report to the base station using the channel response estimation value estimated by channel response estimating section 116 and outputs the CQI frame to transmitting section 100. This CQI frame is used by the base station for frequency scheduling, adaptive modulation and the like, and specifies modulation parameters (such as a modulation scheme, coding rate and transmission power) of transmission data from the base station. Details will be described later.

On the other hand, in transmitting section 100, encoding section 101 performs error correcting coding processing to uplink transmission data and the CQI frame outputted from CQI frame generating section 117 and outputs the encoded data to modulating section 102. Modulating section 102 performs predetermined modulation processing such as QPSK and 16QAM and secondary modulation processing (e.g., OFDM modulation) used in uplink and outputs the modulated signal to radio transmission processing section 103. Radio transmission processing section 103 converts the baseband transmission signal outputted from modulating section 102 to an RF (Radio Frequency) transmitting band signal and transmits this RF signal through antenna 118.

Figure 2:
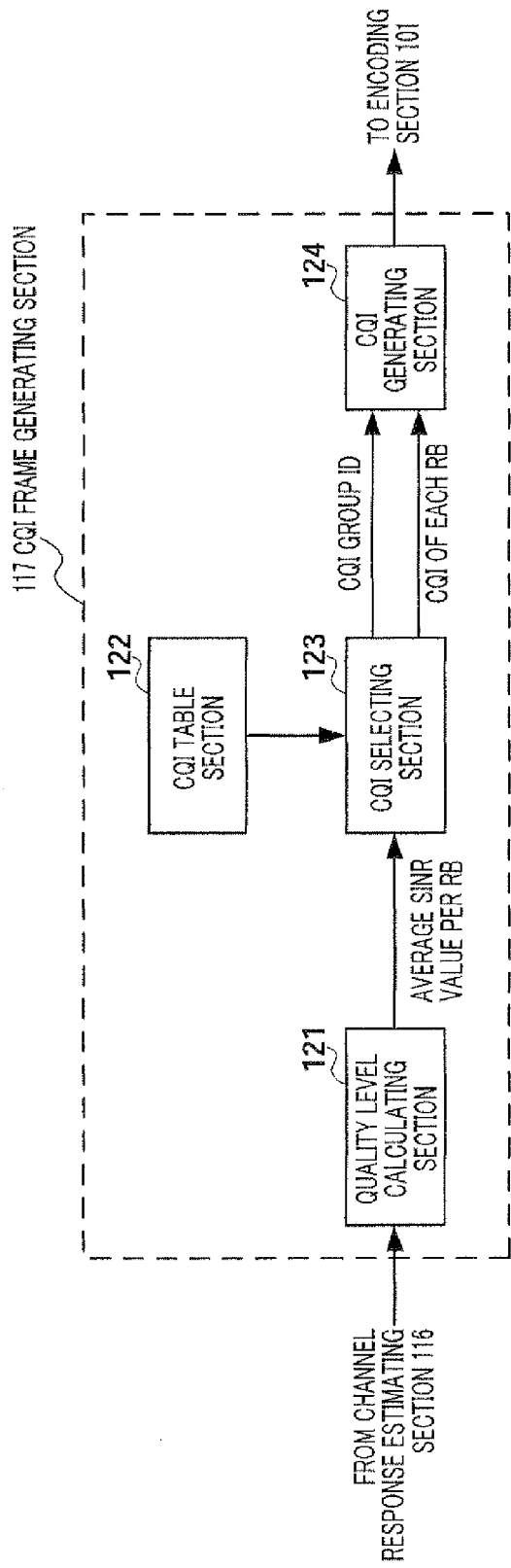
FIG. 2 is a block diagram showing the main internal configuration of a CQI frame generating section according to Embodiment 1.

FIG. 2 is a block diagram showing the main internal configuration of above-described CQI frame generating section 117.

Quality level calculating section 121 calculates an average SINR value for each resource block based on the frequency response of the channel on a per subcarrier basis estimated at channel response estimating section 116 and outputs the average SINR value to CQI selecting section 123.

CQI table section 122 holds modulation parameters such as a modulation scheme, coding rate and transmission power as a CQI table in a ROM (Read Only Memory). In this CQI table, CQI's are divided into a plurality of groups (hereinafter "CQI group") according to a certain rule and stored. In other words, this CQI table stores a plurality of CQI groups in combination with a plurality of CQI's included in the CQI groups. CQI table section 122 adaptively outputs content of the CQI table to CQI selecting section 123 according to the request from CQI selecting section 123.

With reference to the above-described CQI table, CQI selecting section 123 selects a CQI according to the received quality calculated at quality level calculating section 121 and outputs the CQI to CQI generating section 124. More specifically, CQI selecting section 123 receives an average SINR value for each resource block from quality level calculating section 121. CQI selecting section 123 estimates the range (fluctuation width) of received quality of all resource blocks targeted for report and a degree of variation (variance) in the received quality, from this SINR value for each resource block. CQI selecting section 123 then selects a CQI in two stages based on these estimated values. That is, CQI selecting section 123 selects an appropriate CQI group corresponding to the above-described estimated value as a first stage and then selects a CQI value corresponding to the above-described estimated value from among CQI's included in the selected CQI group as a second stage. Here, the CQI group is commonly applied to all resource blocks, but a CQI further selected from within the selected group corresponds to each resource block. CQI selecting section 123 outputs identification information (CQI group ID) showing the selected CQI group and information related to the CQI selected from this group (a plurality of CQI values corresponding to the respective resource blocks) to CQI generating section 124.

CQI generating section 124 generates a CQI frame to be transmitted to the base station by combining CQI group ID and a CQI value for each resource block outputted from CQI selecting section 123, and outputs the CQI frame to encoding section 101.

The CQI report method according to the above embodiment will be described in detail using FIG. 3 and FIG. 4.

FIG. 3 shows an example of all CQI's available in the communication system where the multicarrier communication apparatus according to this embodiment is accommodated. Here, variations of modulation schemes include QPSK, 8PSK, 16QAM and 64QAM, and variations of coding rate include 1/3, 1/2, 2/3, 3/4 and 5/6. Furthermore, the case is described here as an example where communication is performed by duplicating (repeating) symbols to a plurality of symbols, and so a repetition factor (RF), which is the number of repetition symbols, is also defined, and it is assumed that RF=1, 2, and 4 is applied only in the case of a QPSK scheme here.

In the example of this figure, thirty types of CQI's or thirty one types of CQI's including a CQI showing a state where communication is not possible, are available as combinations. When the whole communication system is observed, CQI variations in such a range exist, and so, when CQI report is performed per resource block, the number of CQI bits required for CQI report is five (=thirty-two combinations). Furthermore, when available transmission parameters such as transmission antennas when using antenna diversity and stream number when adopting a MIMO-SDM (Multi-Input/Multi-Output-Space Division Multiplexing) scheme, increase, available CQI's increase, and therefore the amount of CQI report further increases.

Therefore, as already described, this embodiment selects a CQI which belongs to any one of CQI groups as a CQI to be actually used. That is, the actual CQI is selected from a CQI group which has fewer alternatives, so that the amount of CQI report can be reduced.

To cover all kinds of channel environment of all communication terminals supported by the communication system, CQI's are provided with a dynamic wide range of alternatives. However, when attention is focused on a certain communication terminal, the channel environment of this communication terminal is limited, and necessary CQI's fall within a more limited range. Especially, when instantaneous channel responses are considered, the necessary CQI's are more limited. Therefore, even when the range of alternatives of CQI's is limited as described above, there may be few cases where throughput of the communication system decreases.

Figure 4:
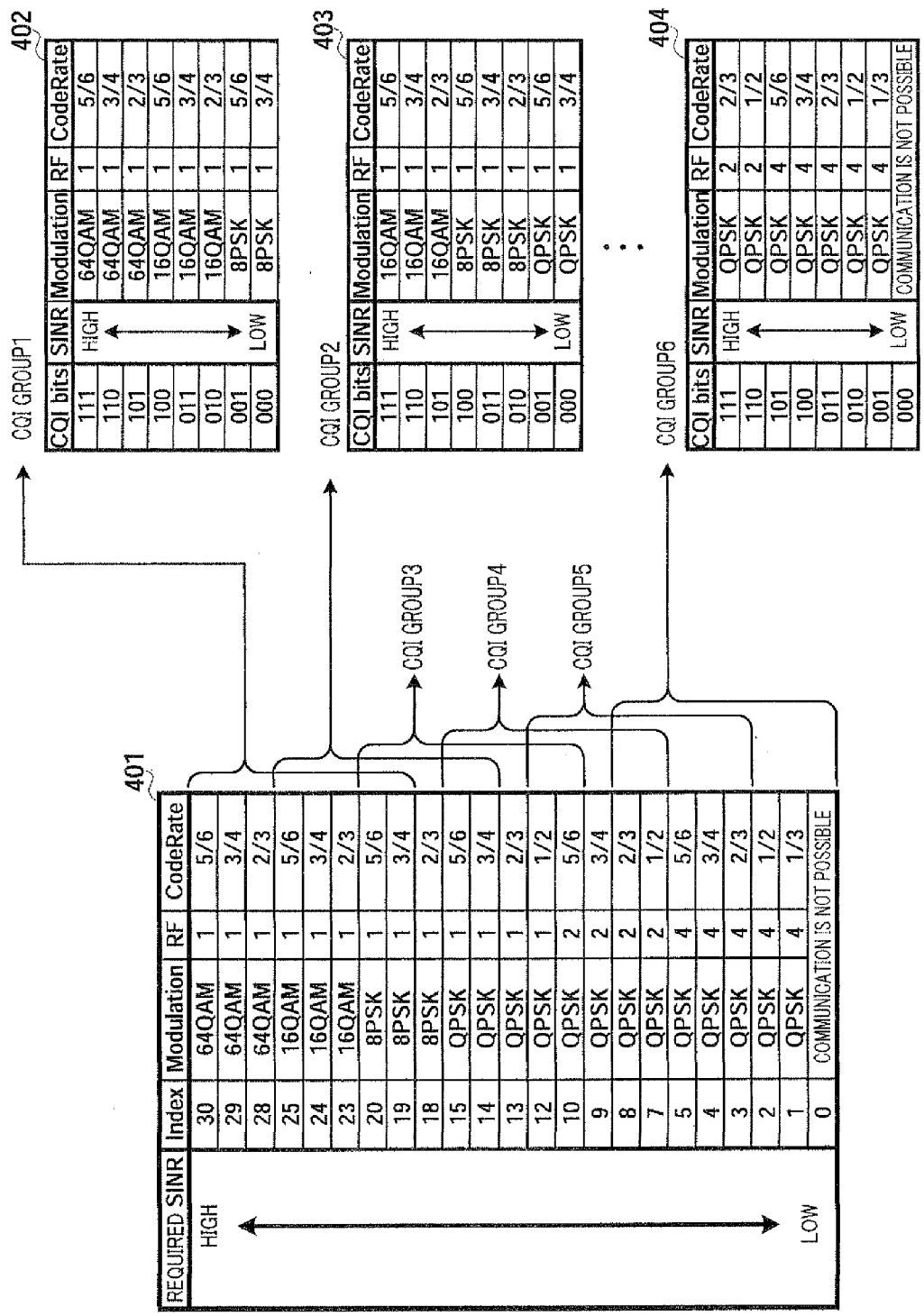
FIG. 4 illustrates the data structure of a CQI table according to Embodiment 1.

FIG. 4 illustrates the data structure of a CQI table according to this embodiment. The method of setting a CQI group will also be described in detail using this figure.

Reference numeral 401 is a CQI table set such that CQI's available in the communication system according to this embodiment (see FIG. 3) are arranged in descending order of required SINR's, and, when CQI's have the same transmission rate, one CQI having a lower required SINR is selected.

In this embodiment, CQI's of similar received quality are put together as one group. More specifically, based on CQI table 401, eight CQI's are grouped into CQI groups 1 to 6. Reference numeral 402 shows CQI group 1 set with CQI's having the highest required SINR's, and 403 shows CQI group 2 set with CQI's having the second highest required SINR's. CQI group 4 is set for CQI's having medium required SINR's. Reference numeral 404 shows CQI group 6 set with CQI's having the lowest required SINR's.

Furthermore, CQI's included in the CQI groups in this embodiment are set so as to overlap each other among groups. This makes it possible to support more diversified communication terminal channel environments.

Although a case has been described with this example where CQI's of the same coding rate are put together as one group, a coding rate in one group may vary or the same modulation scheme may also be included in the same group, if CQI's included in the groups cover a wide range of received quality and intervals between required quality levels of CQI's are set to be uniform to a certain degree.

Figure 5:
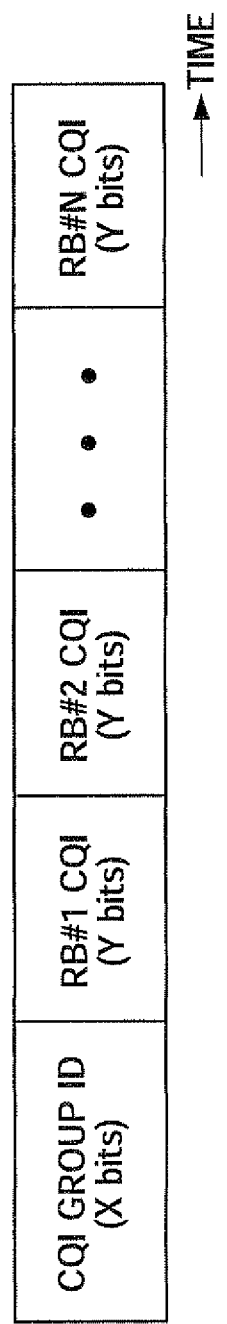
FIG. 5 shows the frame configuration of a transmission frame for CQI report according to Embodiment 1.

FIG. 5 shows the frame configuration of a transmission frame for CQI report according to this embodiment.

CQI frame generating section 117 generates a transmission frame for CQI report as shown in this figure from a CQI group ID selected by CQI selecting section 123 and CQI bits corresponding to each resource block (information bits to identify each CQI).

Here, the number of bits X of the CQI group ID depends on the number of CQI groups set in the system. That is, in the case of X bits, $2^X$ types of CQI groups can be set. Furthermore, the number of CQI bits Y corresponding to each resource block depends on the number of CQI's included in the CQI group. That is, in the case of Y bits, $2^Y$ types of CQI's can be set in one CQI group. For example, in the case of the CQI table shown in FIG. 4, by using this transmission frame for CQI report, it is possible to reduce the number of required CQI bits to three.

The amount of CQI report can be reduced further by reducing the number of CQI groups or types (number) of CQI's included in each CQI group.

Figure 6A:
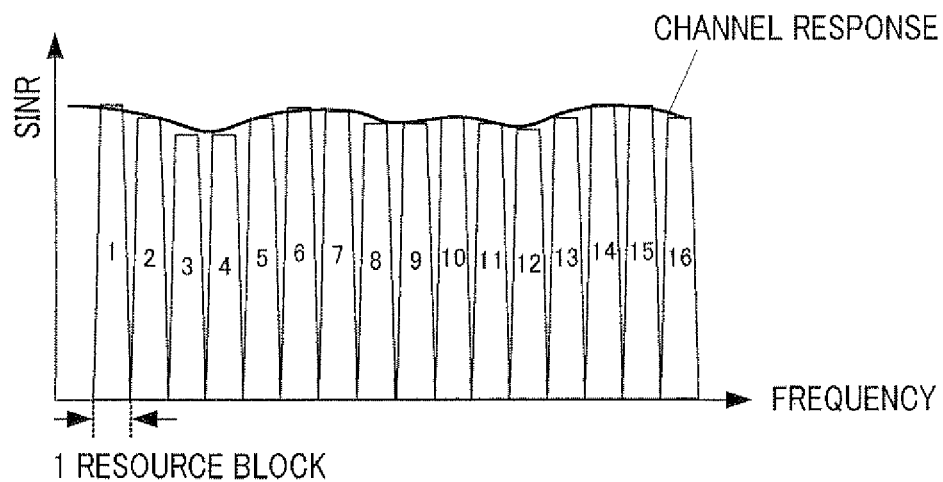
FIG. 6A is a diagram illustrating a communication environment for which the CQI report method according to Embodiment 1 is suitable.
Figure 6B:
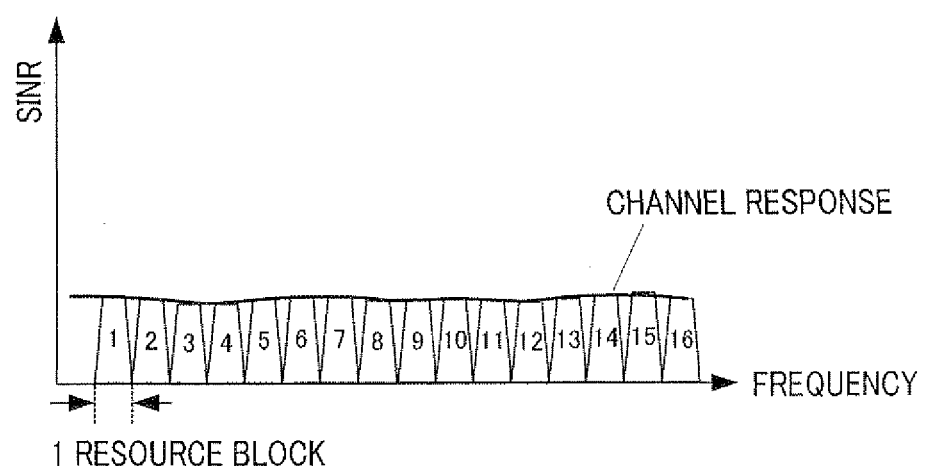
FIG. 6B is another diagram illustrating a communication environment for which the CQI report method according to Embodiment 1 is suitable.

FIGS. 6A and 6B illustrate a communication environment for which the CQI report method according to this embodiment is suitable.

The CQI groups according to this embodiment are grouped by CQI's having similar received quality, and so these groups are suitable for a communication terminal having channel performances with small received quality variations for each resource block as shown in FIGS. 6A and 6B, that is, a communication terminal having received quality performances with moderate frequency selective fading.

In this way, according to this embodiment, a plurality of CQI's are divided into several CQI groups, and a CQI to be actually used is selected from these groups. CQI report is performed using two types of information; identification information showing a selected group and identification information showing a CQI selected in a group. Therefore, by reducing the number of CQI alternatives when deciding a CQI, it is possible to reduce the number of bits necessary to identify a CQI and reduce the amount of CQI report. Reporting of group identification information corresponds to reporting of CQI information with a low degree of accuracy as a first stage. Furthermore, reporting of identification information of a CQI selected in a group corresponds to reporting of CQI information with a high degree of accuracy as a second stage. Here, CQI groups are commonly applied to all resource blocks, and CQI groups varying from one resource block to another are never allocated. On the other hand, a CQI selected in each CQI group can take a value which varies from one resource block to another.

Furthermore, according to this embodiment, resource blocks targeted for CQI report are all resource blocks included in a communication band. That is, for all resource blocks, CQI's are reported within a selected CQI group range. Therefore, the amount of CQI report can be reduced by reducing CQI alternatives while performing CQI report on all resource blocks. That is, irrespective of the number of resource blocks to be reported, the amount of CQI report can be reduced at a fixed rate.

Furthermore, according to this embodiment, out of CQI's available in a communication system, there is a range of CQI's available to a multicarrier communication apparatus such as a mobile station at a certain time point, and therefore CQI's which are currently not used or cannot be used are removed from the alternatives of CQI report, so that the number of CQI bits for each resource block can be reduced.

Furthermore, according to this embodiment, CQI's having similar received quality such as required SINR's are put together as one group. Therefore, it is possible to make finer and more accurate selections of appropriate CQI's for communication terminals having little variation in received quality among resource blocks.

Furthermore, according to this embodiment, CQI's are divided into a plurality of CQI groups and stored beforehand in a CQI table based on a certain rule. These CQI groups are known between a transmitting apparatus and a receiving apparatus, that is, between a base station and a communication terminal. Therefore, it is not necessary to report information as to how CQI's are specifically grouped.

Although a case has been described with this embodiment here as an example where CQI groups are preset and fixed, CQI groups can also be adaptively set according to an environment where the communication system is used, for example, outdoors or indoors in urban areas or suburbs, or according to channel states of the connected communication terminal. When the CQI groups are adaptively set, information of the setting is periodically reported from the base station to the communication terminal and the like through broadcast channels and the like.

Furthermore, although a case has been described with this embodiment as an example where CQI selecting section 123 selects a CQI according to received quality in two stages, that is, selects a CQI group at a first stage and selects an actual CQI from the group at a second stage, in the present invention, it is only necessary to form CQI information with two-stage information; identification information of a CQI group and identification information of a CQI actually selected in this group, to reduce the amount of CQI report. Therefore, CQI selecting section 123 may directly select a CQI according to received quality first, then recognize a CQI group where this selected CQI is included, and, based on the reorganization, generate identification information of the CQI group and identification information of the actually selected CQI.

Furthermore, although a case has been described with this embodiment as an example where a communication terminal selects a CQI group, it is also possible to adopt a configuration where the base station specifies a CQI group beforehand per communication terminal.

Embodiment 2

The configuration of a multicarrier communication apparatus according to Embodiment 2 of the present invention has the same basic configuration as the multicarrier communication apparatus shown in Embodiment 1, and therefore explanations thereof will be omitted, and only differences from Embodiment 1, that is, the data structure of a CQI table will be described below.

Figure 7:
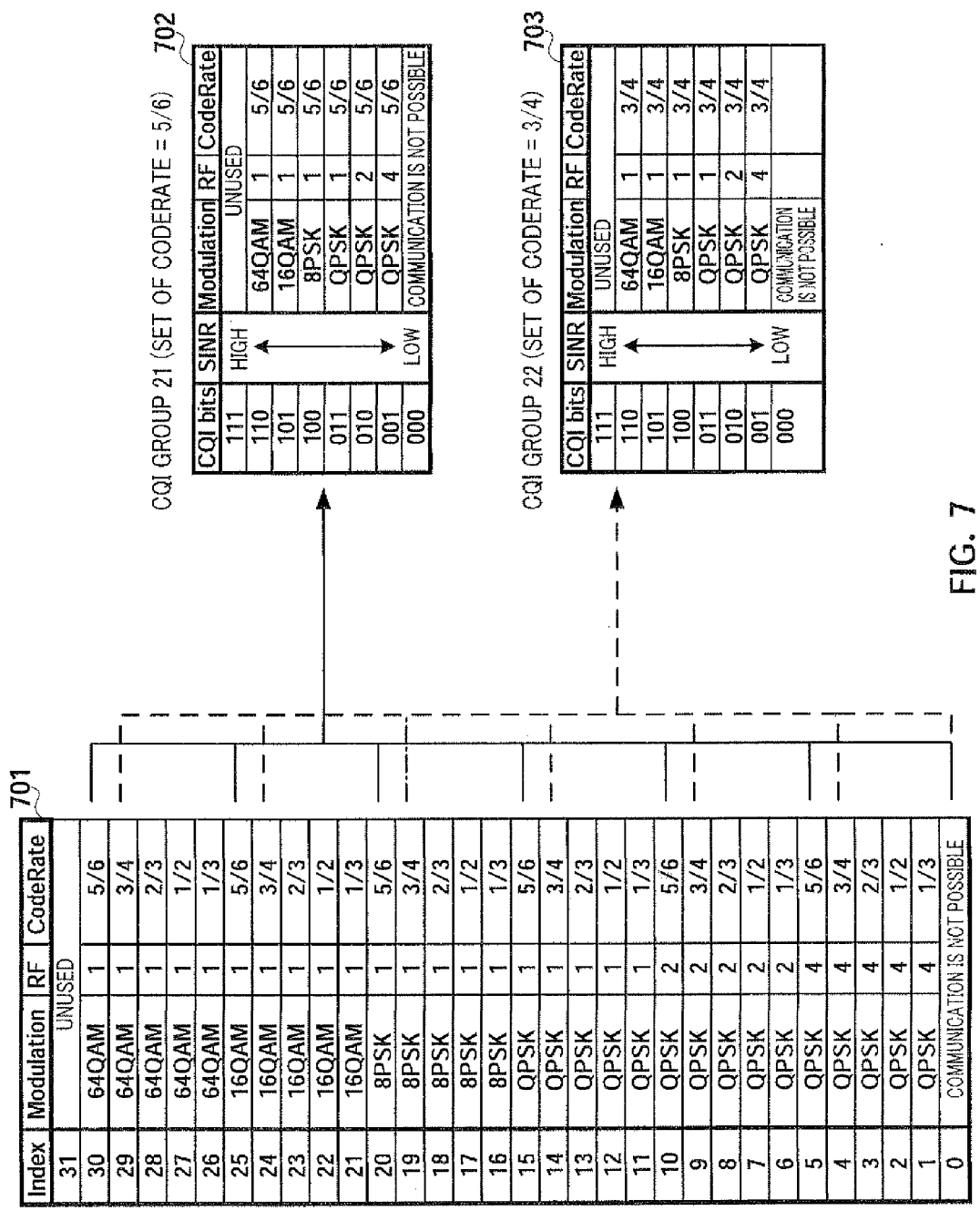
FIG. 7 is a diagram illustrating the data structure of a CQI table according to Embodiment 2.
Figure 8:
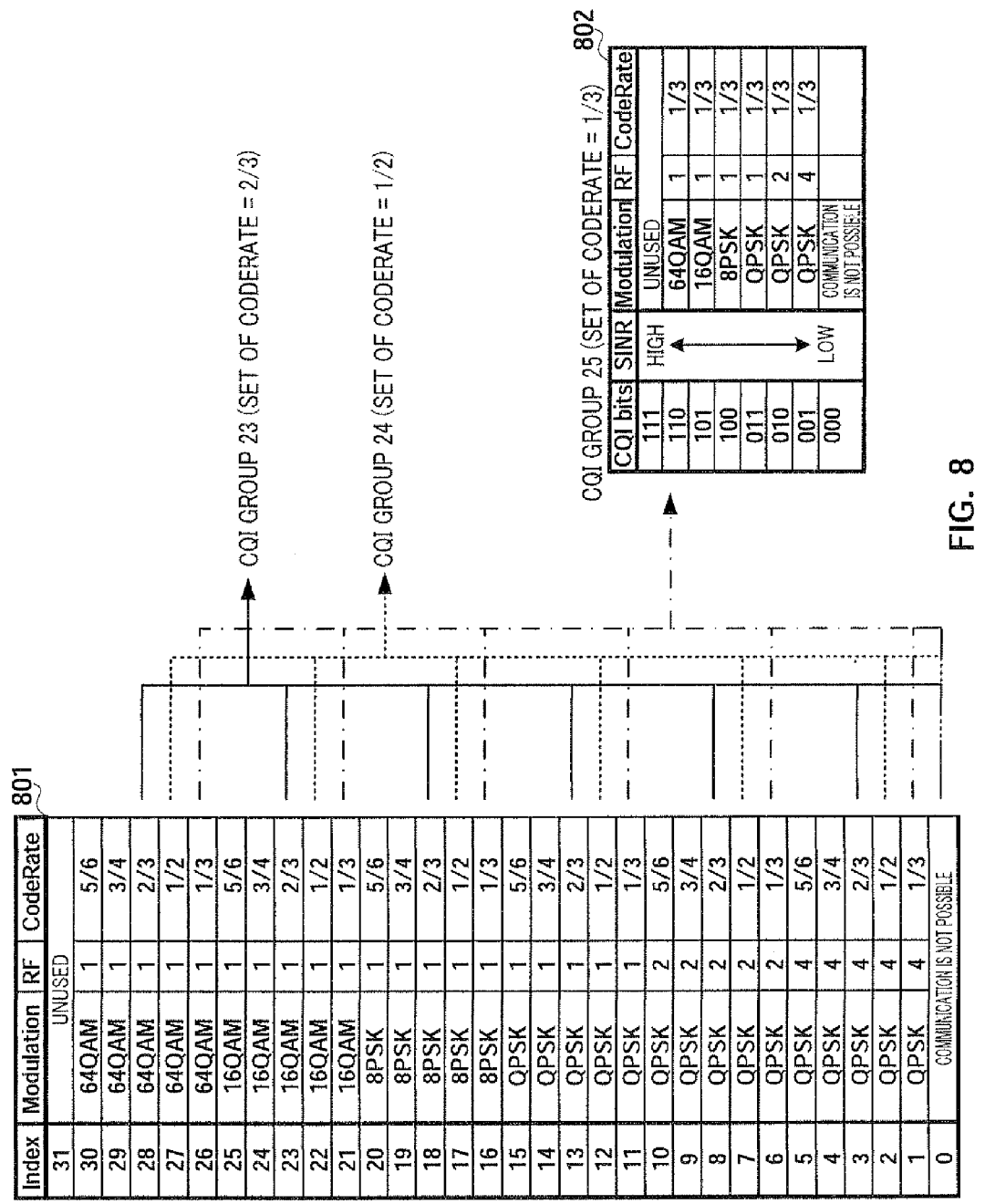
FIG. 8 is another diagram illustrating the data structure of the CQI table according to Embodiment 2.

FIG. 7 and FIG. 8 illustrate the data structure of a CQI table according to this embodiment.

Reference numerals 701 and 801 show CQI tables showing CQI's available in the communication system according to this embodiment. CQI's are arranged in descending order of required SINR's. Based on this CQI table arranged in descending order of required SINR's, CQI groups 21 to 25 are set such that the number of CQI's included in each CQI group is eight.

More specifically, as shown by reference numeral 702, CQI group 21 is composed of CQI's showing all modulation schemes having coding rate R=5/6 and a CQI showing that communication is not possible. Furthermore, as shown by reference numeral 703, CQI group 22 is composed of CQI's showing all modulation schemes having coding rate R=3/4 and a CQI showing that communication is not possible. Furthermore, as shown by reference numeral 802, CQI group 25 is composed of CQI's showing all modulation schemes having coding rate R=1/3 and a CQI showing that communication is not possible. The same applies to CQI groups 23 and 24.

By setting the CQI groups in this way, the range of required SINR's of CQI's included in one CQI group can support a wide range from low SINR's to high SINR's, and intervals between required SINR's among CQI's can also be uniformly set. The number of CQI bits necessary for CQI report is also three in this case as in the case of Embodiment 1.

In this way, according to this embodiment, a CQI group is composed of CQI's with wide intervals between required received quality levels so as to cover a wide range of required received quality of CQI's in one CQI group. Therefore, it is possible to assign appropriate CQI's corresponding to a wide range of required received quality for communication terminals having large variations in the received quality among resource blocks without being biased to partial required received quality and thereby improve the accuracy of CQI report.

Figure 9A:
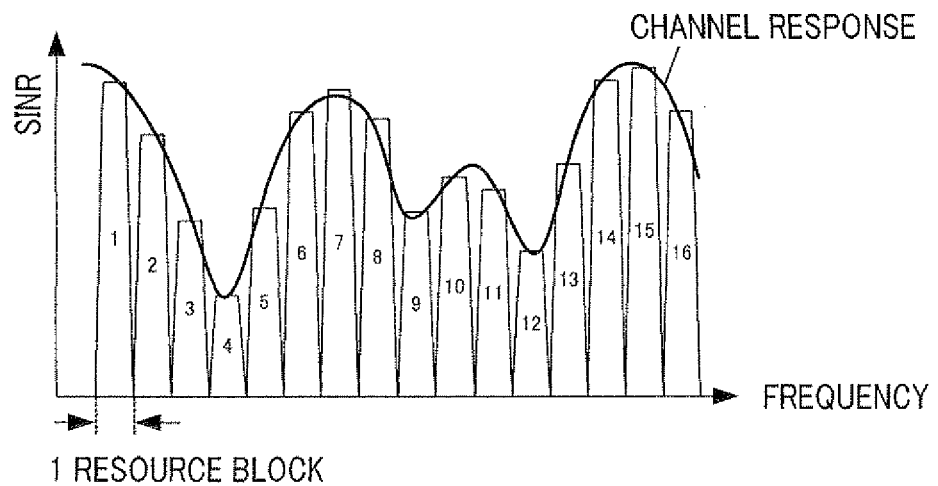
FIG. 9A is a diagram illustrating a communication environment for which the CQI report method according to Embodiment 2 is suitable.
Figure 9B:
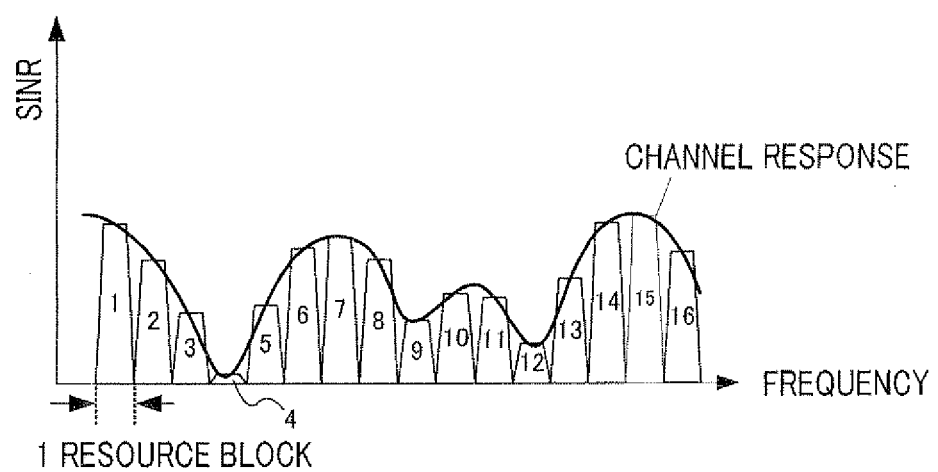
FIG. 9B is another diagram illustrating a communication environment for which the CQI report method according to Embodiment 2 is suitable.

FIGS. 9A and 9B illustrate a communication environment for which the CQI report method according to this embodiment is suitable.

The CQI group according to this embodiment is suitable for communication terminals as shown in FIGS. 9A and 9B having channel performances with large variations of the received quality among resource blocks, that is, communication terminals having received quality performances with significant frequency selective fading.

Embodiment 3

The configuration of a multicarrier communication apparatus according to Embodiment 3 of the present invention also has the same basic configuration as the multicarrier communication apparatus shown in Embodiment 1, and therefore explanations thereof will be omitted and only differences from Embodiments 1 and 2, that is, the data structure of a CQI table will be described below.

Figure 10:
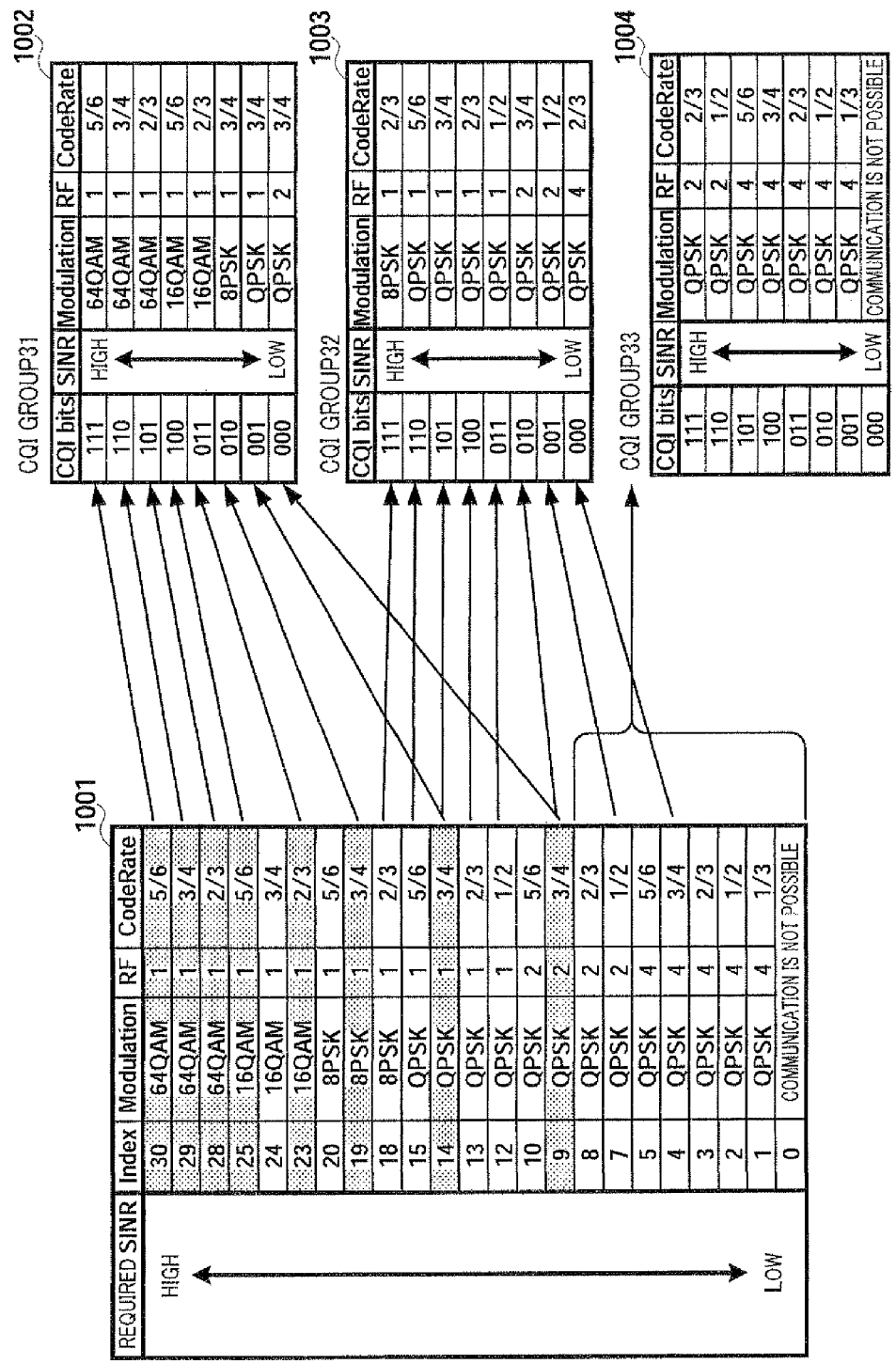
FIG. 10 illustrates the data structure of a CQI table according to Embodiment 3.

FIG. 10 illustrates the data structure of a CQI table according to this embodiment.

Reference numeral 1001 shows a diagram showing CQI's arranged in descending order of required SINR's available in the communication system according to this embodiment. Based on this CQI table arranged in descending order of required SINR's, CQI groups where the number of CQI's is limited to eight are set.

More specifically, as shown by reference numeral 1002, CQI group 31 selects a plurality of CQI's with wide intervals between required SINR's so as to include a plurality of CQI's having the highest required SINR's (indexes 30, 29, 28 and 25) and include several CQI's having low required SINR's (indexes 23, 19, 14, and 9) in addition to the plurality of CQI's having high required SINR's, and sets these CQI's in the same group.

Furthermore, as shown by reference numeral 1003, CQI group 32 performs the setting so as to include CQI's having medium required SINR's (indexes 18, 15, 13, and 12) and include several CQI's having low required SINR's (indexes 9, 7, and 4) as in the case of CQI group 31.

In this way, CQI groups 31 and 32 are composed of such CQI's that, when the required received quality becomes lower, the intervals between required received quality levels become wider. Especially in a range of high required SINR's, such CQI's are selected that intervals of the required SINR's between CQI's become narrower, and in a range of low required SINR's, such CQI's are selected that intervals of required SINR's between CQI's become wider.

On the other hand, as shown by reference numeral 1004, CQI group 33 is composed of only CQI's having required SINR's equal to or lower than a predetermined level. This CQI group 33 has the same setting as group 6 shown in Embodiment 1 (see FIG. 4).

In this way, this embodiment includes CQI's with equal intervals in groups in a range of high required received quality, and includes CQI's covering a wide range in groups in a range of low required received quality although intervals become wider. This allows the accuracy of CQI report to be improved. For example, when it is assumed that CQI's of indexes of 23, 19, 14 and 9 are not included in CQI group 31, if actually required CQI's are outside the range of CQI group 31, that is, received quality for resource blocks is lower than the CQI of index 25, although these resource blocks are resource blocks where communication is possible, "communication is not possible" is reported or appropriate CQI's cannot be reported, that is, CQI's of required received quality higher than the actual received quality are reported. As a result, it is not possible to allocate transmission data or set appropriate modulation parameters for these resource blocks. However, adopting the above-described configuration can cover a wide range of CQI's and thereby prevent this problem.

Figure 11A:
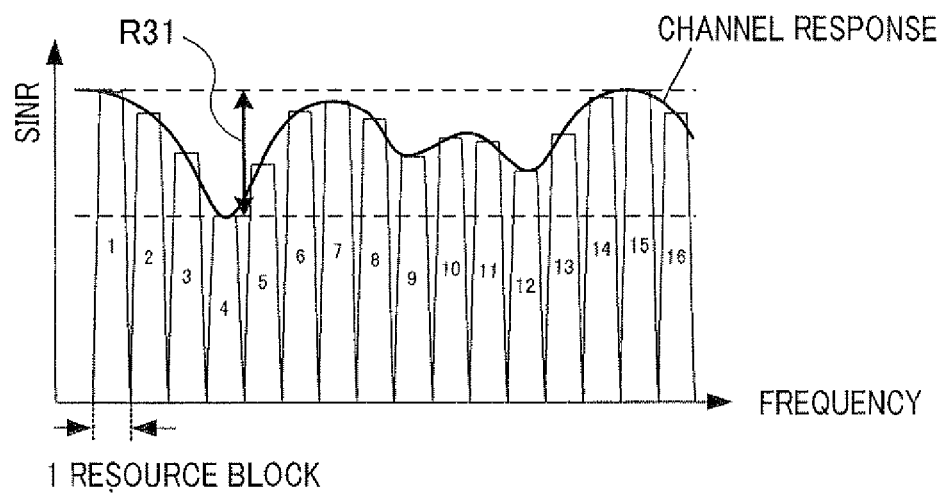
FIG. 11A is a diagram illustrating a communication environment for which the CQI report method according to Embodiment 3 is suitable.
Figure 11B:
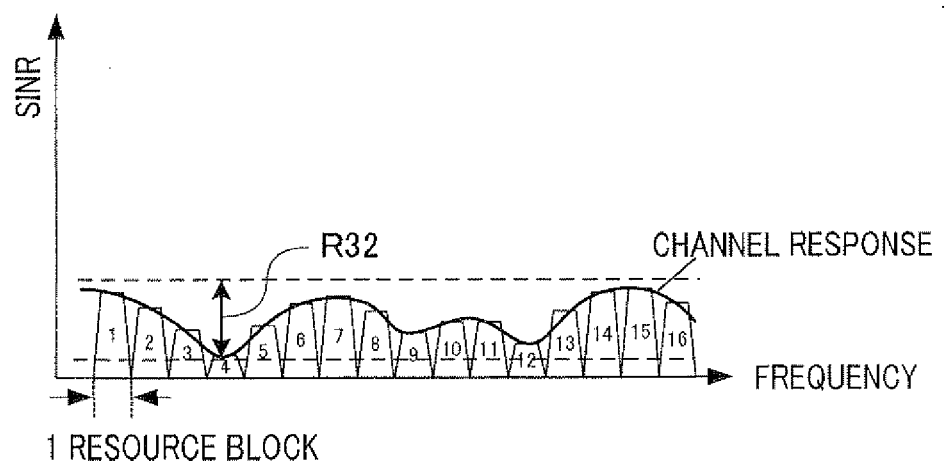
FIG. 11B is another diagram illustrating a communication environment for which the CQI report method according to Embodiment 3 is suitable.

FIGS. 11A and 11B are diagrams illustrating a communication environment for which the CQI report method according to this embodiment is suitable.

FIG. 11A shows an example where received quality of a whole channel is high and influences of noise, interference power and the like are small, and therefore received quality range R31 where communication is possible is wide. On the other hand, FIG. 11B shows an example where received quality of a whole channel is small and influences of noise, interference power and the like are large, and therefore received quality range R32 where communication is possible is narrow. The CQI groups according to this embodiment are suitable for communication terminals as shown in FIGS. 11A and 11B having such channel performances that an arrival wave becomes Rayleigh fading.

Furthermore, according to this embodiment, a CQI group is composed of such CQI's that, when the required received quality becomes lower, the intervals of required received quality between CQI's gradually become wider. This is for the following reason.

Figure 12:
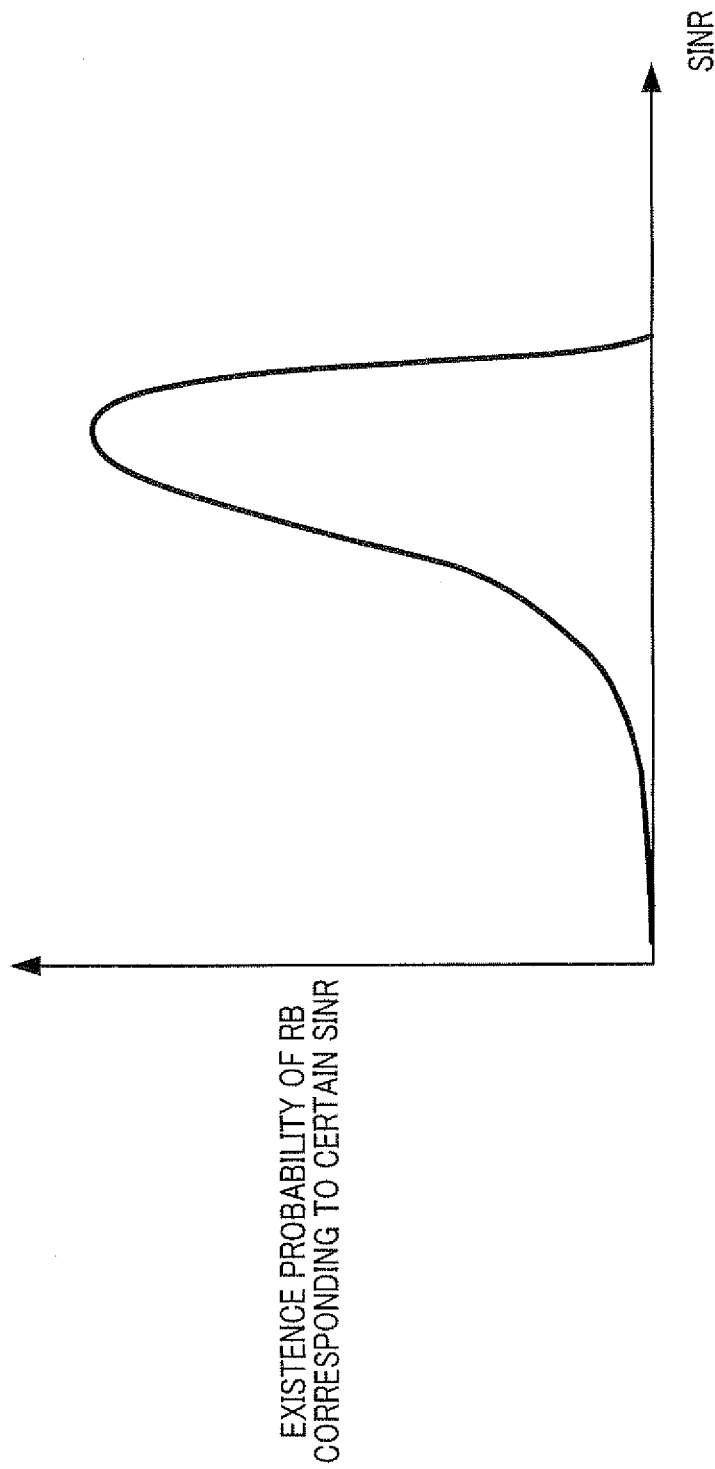
FIG. 12 is a graph showing an existence probability of RB corresponding to a certain SINR.

FIG. 12 is a graph showing an existence probability of resource blocks for which CQI's showing required SINR's should be reported to a base station. That is, this graph shows that, when the value of the existence probability decreases, the number of resource blocks for which CQI's showing those SINR's should be reported decreases. Here, this embodiment assumes a case where the channel is in a frequency selective Rayleigh fading environment.

As shown in this figure, when a required SINR becomes lower, the number of resource blocks (existence probability) for which corresponding CQI's should be reported decreases. Therefore, when the required SINR becomes lower, their CQI's are hardly used. Therefore, considering a contribution to effect, this embodiment makes a setting of lowering the accuracy of CQI report (lowering resolution of reported CQI) so as to widen intervals of required SINR's between CQI's in an area of low required SINR's. This allows the range of required received quality covered by CQI's to be widened while maintaining an expected value of the accuracy of CQI report.

Furthermore, according to this embodiment, when CQI groups are compared with each other, required received quality corresponding to the CQI's is not distributed in the same way. However, even in such a case, the number of CQI bits necessary for CQI report is three.

Although a case has been described with this embodiment as an example where, when the required received quality becomes lower, the intervals of received quality between CQI's gradually become wider, a setting may also be made such that the intervals of the received quality become wide, although the intervals of the received quality are equal, in a range where the required received quality is low. This is because such a configuration also allows the object of covering a wide range of required received quality to be attained.

Embodiment 4

Figure 13A:
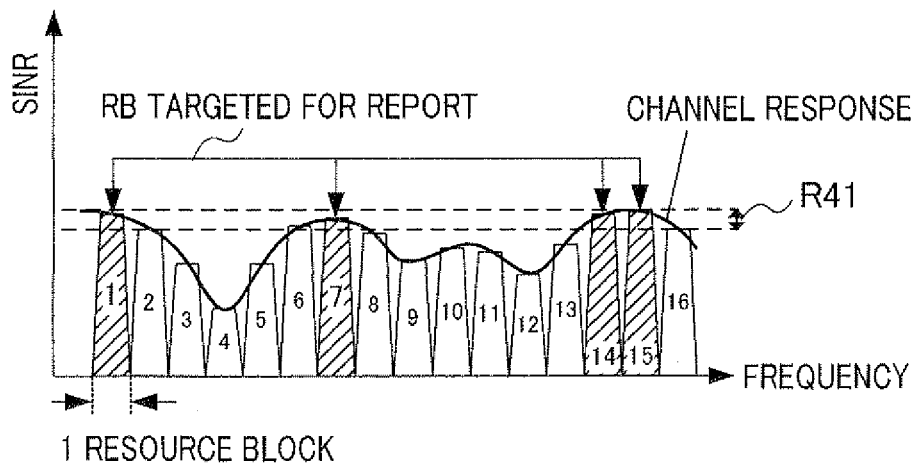
FIG. 13A is a diagram illustrating resource blocks targeted for CQI report according to Embodiment 4.
Figure 13B:
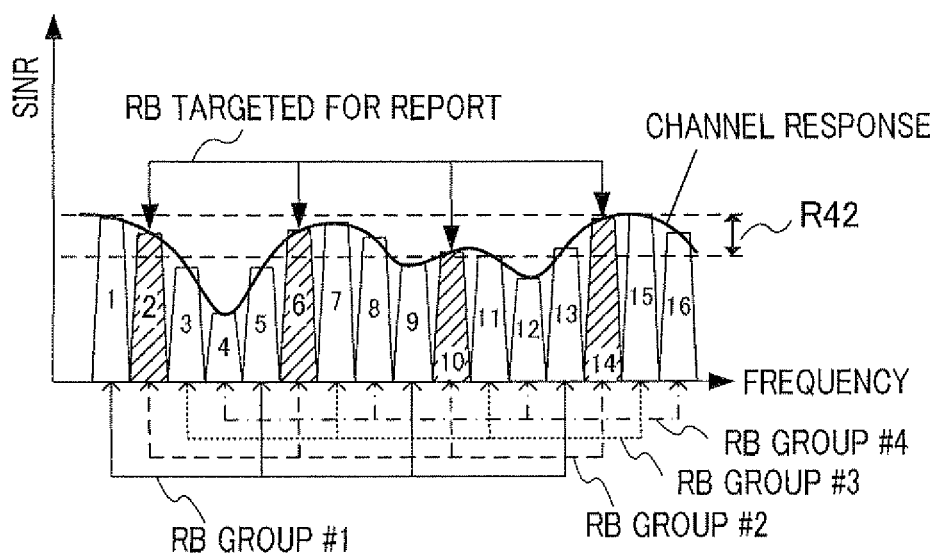
FIG. 13B is another diagram illustrating resource blocks targeted for CQI report according to Embodiment 4.

FIGS. 13A and 13B illustrate resource blocks targeted for CQI report according to Embodiment 4 of the present invention. FIGS. 13A and 13B show received quality performances (channel responses) of the resource blocks and also show resource blocks targeted for report by diagonal line.

FIG. 13A shows an example where each communication terminal selects a predetermined number "four" of resource blocks in descending order of received quality and performs CQI report on these resource blocks. In this example, fluctuation width R41 of CQI's among resource blocks targeted for report is small.

FIG. 13B shows an example where each communication terminal selects an appropriate RB group with the highest transmission efficiency from RB groups #1 to #4 and performs CQI report on this RB group. The communication terminal selects RB group #2, and so fluctuation width R42 of CQI's among resource blocks targeted for report becomes small.

In this way, in this embodiment, the number of resource blocks targeted for report varies depending on various conditions. A plurality of CQI tables are also provided according to the number of resource blocks, and these are used differently depending on the number of resource blocks.

The configuration of a multicarrier communication apparatus according to this embodiment has the same basic configuration as the multicarrier communication apparatus shown in Embodiment 1, and therefore explanations thereof will be omitted and CQI frame generating section 117a which has the configuration different from Embodiment 1 will be described below.

Figure 14:
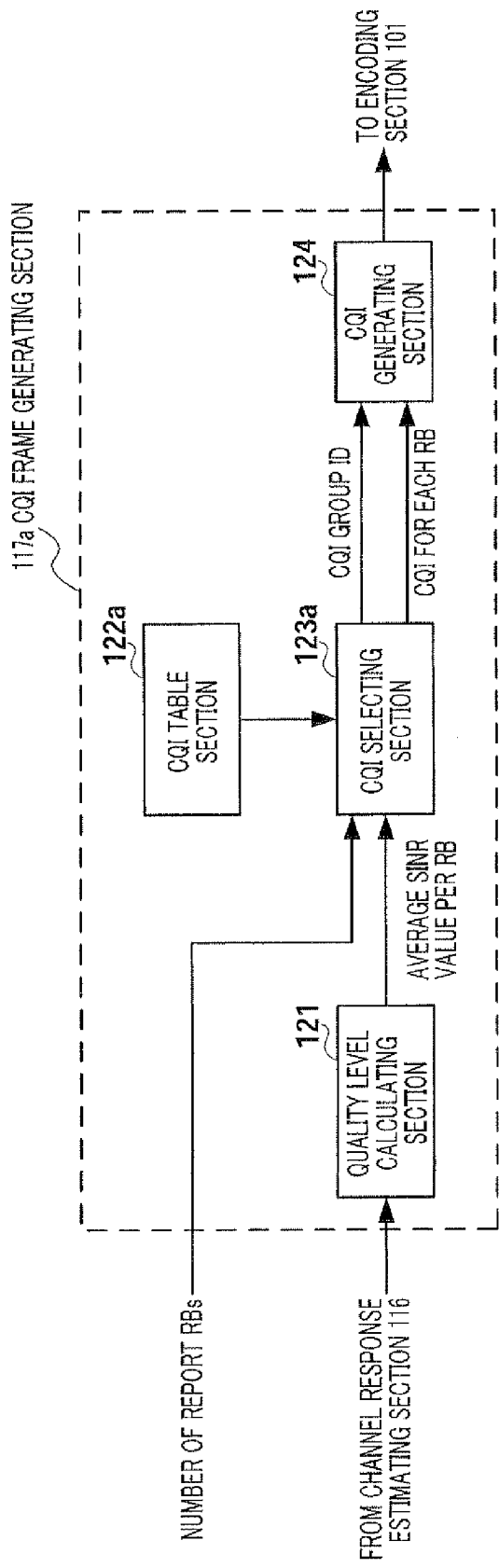
FIG. 14 is a block diagram showing the main internal configuration of a CQI frame generating section according to Embodiment 4.

FIG. 14 is a block diagram showing the main internal configuration of CQI frame generating section 117a. The same components as in CQI frame generating section 117 shown in Embodiment 1 are assigned the same reference numerals and explanations thereof will be omitted, and components having similar functions are shown by assigning alphabets in addition to the same reference numerals.

This CQI frame generating section 117a receives report RB number information determined from a report RB number determining section (not shown).

CQI table section 122a holds a plurality of CQI tables corresponding to the number of resource blocks to be reported. Details will be described later.

CQI selecting section 123a selects an appropriate CQI table from among CQI tables held in CQI table section 122a based on the number of report RBs to be inputted and determines a CQI value for each resource block targeted for report using the CQI table.

Figure 15:
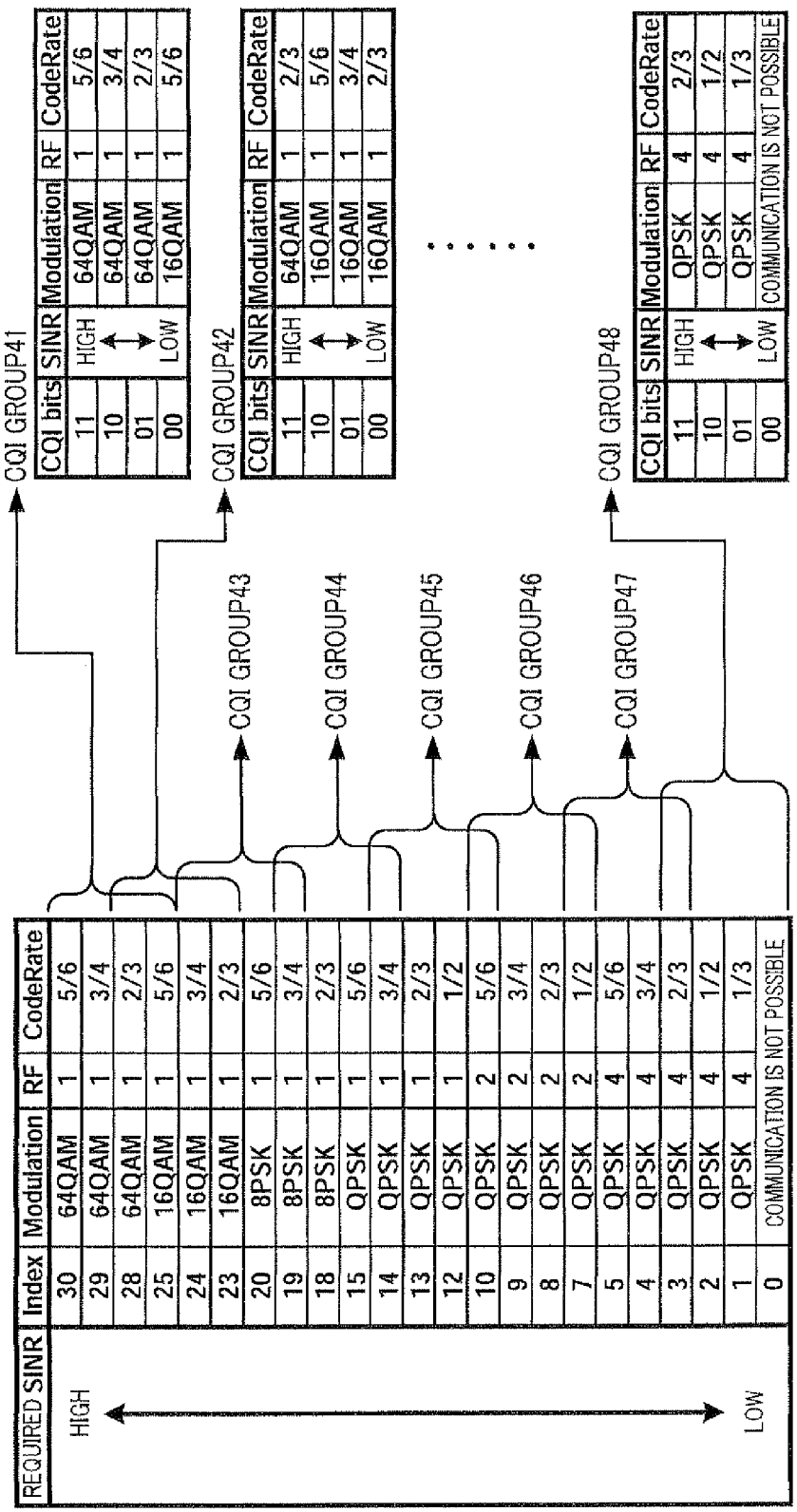
FIG. 15 shows an example of a CQI table according to Embodiment 4.

FIG. 15 shows an example of the CQI table held in CQI table section 122a. Furthermore, CQI table section 122a also holds other types of CQI tables, and the CQI table shown in FIG. 4 is one such example.

In these tables, although each CQI group is composed of CQI's having similar required received quality, the CQI table shown in FIG. 15 sets the number of CQI's included in each CQI group to four unlike the CQI table shown in FIG. 4.

When the number of resource blocks targeted for report becomes smaller, the variation of received quality in these resource blocks becomes smaller, and so the CQI table shown in FIG. 15 limits the number of CQI's included in each CQI group according to the reduction in the number of resource blocks. In the example of FIG. 15, the number of necessary CQI bits is two.

Figure 16:
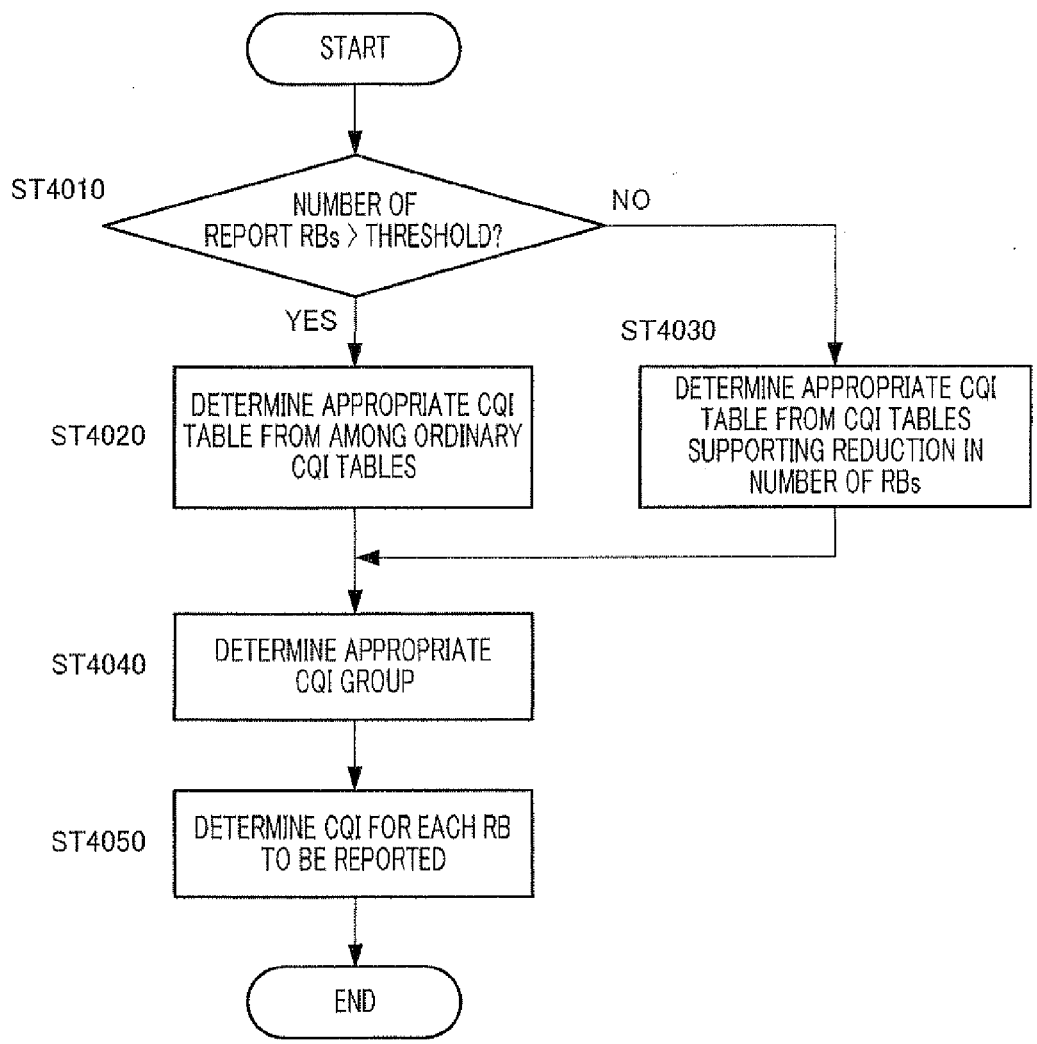
FIG. 16 is a flowchart showing processing steps for a report CQI determining method according to Embodiment 4.

FIG. 16 is a flowchart showing processing steps of a report CQI determining method according to this embodiment.

This embodiment compares the number of report RBs with a predetermined threshold (ST4010), and, when the number of report RBs is greater than the predetermined threshold, determines an appropriate CQI table from among ordinary CQI tables (ST4020). Here, the "ordinary CQI table" refers to a CQI table which does not support a reduction in the number of resource blocks, and, for example, the CQI tables shown in Embodiments 1 to 3 correspond to this CQI table.

On the other hand, in ST4010, when the number of report RBs is equal to or smaller than the predetermined threshold, an appropriate CQI table is determined from among a plurality of CQI tables (an example is shown in FIG. 14) set in accordance with a reduction in the number of resource blocks (ST4030).

Next, using the determined CQI table, an appropriate CQI group is selected according to the required received quality (ST4040), and an appropriate CQI for each resource block to be reported is determined from the selected CQI group (ST4050).

Figure 17A:
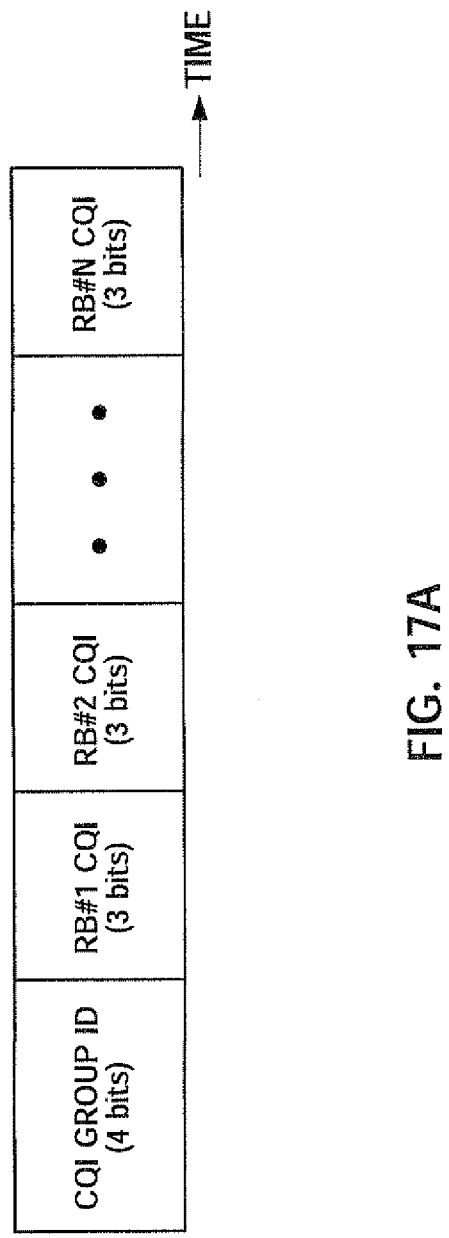
FIG. 17A is a diagram illustrating an amount of CQI report according to a CQI report method according to Embodiment 4.
Figure 17B:
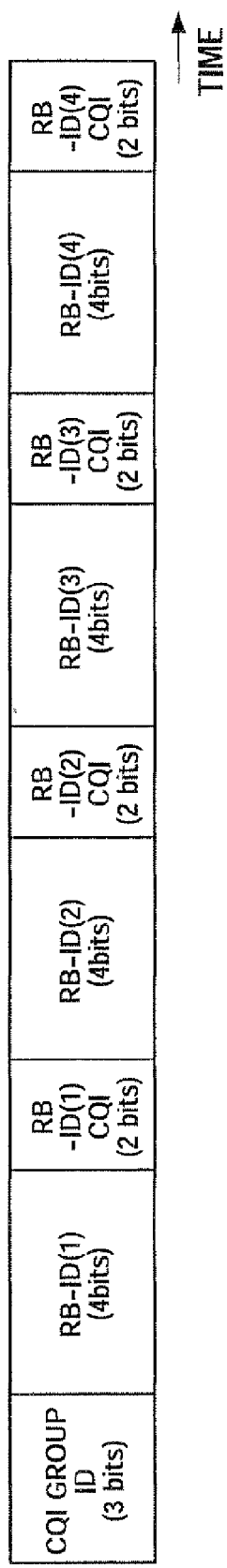
FIG. 17B is another diagram illustrating an amount of CQI report according to the CQI report method according to Embodiment 4.
Figure 17C:
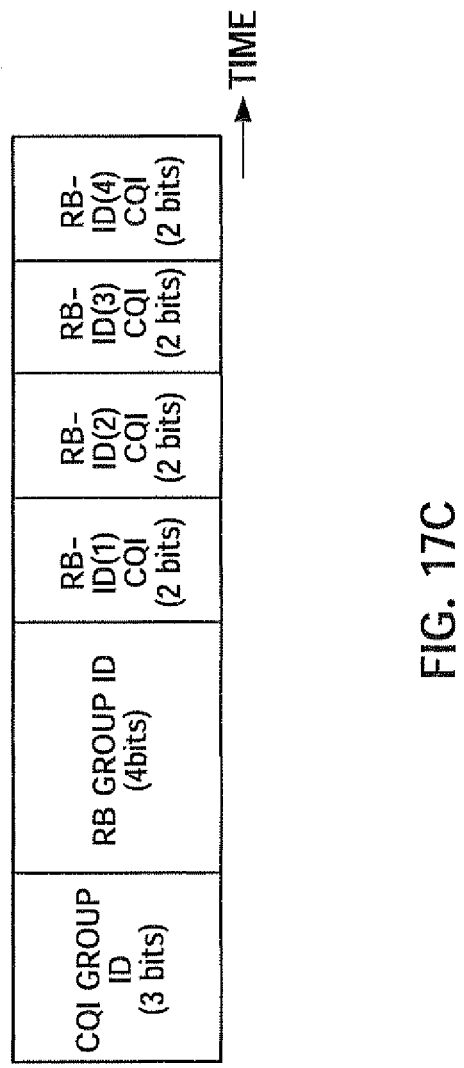
FIG. 17C is still another diagram illustrating an amount of CQI report according to the CQI report method according to Embodiment 4.

FIGS. 17A, 17B and 17C are diagrams illustrating the amount of CQI report of the CQI report method according to this embodiment.

As shown in the above-described flow, the CQI table to be used varies depending on whether the number of resource blocks targeted for report is greater or smaller than a predetermined threshold. Therefore, the number of bits showing CQI group ID and the number of CQI bits for each resource block also vary depending on the difference in the CQI table.

When the number of resource blocks targeted for report is greater than the predetermined threshold, the transmission frame is as shown in FIG. 17A, for example. The figure shows an example where the number of CQI groups is sixteen types and the number of CQI's included in each CQI group is eight. Therefore, CQI group ID is expressed with four bits and CQI information corresponding to each resource block is expressed with three bits.

On the other hand, when the number of resource blocks targeted for report is equal to or smaller than the predetermined threshold, the transmission frames are as shown in FIG. 17B or FIG. 17C, for example. FIG. 17B shows a case where a predetermined number of resource blocks are selected in descending order of received quality, and FIG. 17C shows a case where an RB group of the highest received quality is selected. The figure here shows an example where the number of CQI groups is eight types, and the number of CQI's included in each CQI group is four (when the CQI table shown in FIG. 15 is used). Therefore, CQI group ID is expressed with three bits, and CQI information corresponding to each resource block is expressed with two bits.

In this way, according to this embodiment, when the number of resource blocks targeted for CQI report decreases, the number of CQI's included in each CQI group also decreases accordingly. By this means, it is possible to reduce the amount of CQI report while preventing the accuracy of CQI report from decreasing.

The embodiments of the present invention have been described.

The multicarrier communication system, multicarrier communication apparatus and CQI report method according to the present invention are not limited to the above-described embodiments, and various modifications thereof are possible. For example, the embodiments have disclosed a plurality of CQI tables suitable for a variety of channel states, that is, a plurality of types of CQI grouping method according to the channel environment. Therefore, the present invention can be realized by combining these methods as appropriate.

More specifically, it is possible to set both a CQI group composed of a set of CQI's having similar received quality and a CQI group composed of a set of CQI's with wide intervals between received quality levels, out of CQI selection candidates, select a CQI group common to resource blocks suitable for received quality of all resource blocks targeted for report from a mobile station and perform CQI report. By this means, the mobile station can use an appropriate CQI group suitable for received quality for CQI report while reducing the number of CQI bits. That is, it is possible to effectively reduce the amount of CQI report without losing substantially any multi-user diversity gain.

For example, as shown in FIG. 6A, when a variation of received quality among resource blocks is small and the received quality is high, a CQI group composed of CQI's having similar required SINR's and CQI's having high required SINR's is selected. On the other hand, as shown in FIG. 11A, when a variation of received quality among resource blocks is large, a group which allows more appropriate CQI report on the resource blocks is selected out of CQI groups composed of CQI's having large intervals between required SINR's. Here, "more appropriate" means, for example, making a setting so as to minimize the difference between the received quality of each resource block and a required SINR or setting a CQI group that maximizes the transmission efficiency.

The multicarrier communication apparatus according to the present invention can be provided to a communication terminal apparatus and a base station apparatus in a mobile communication system, and can thereby provide a communication terminal apparatus, base station apparatus and mobile communication system having operations and effects similar to those described above.

Furthermore, the multicarrier communication system, multicarrier communication apparatus and CQI report method according to the present invention can also be used in communication systems adopting multicarrier schemes other than OFDM.

The number of CQI groups and the number of CQI bits included in a CQI group are not limited to the values shown in the embodiments.

Also, although cases have been described with the above embodiment as examples where the present invention is configured by hardware. However, the present invention can also be realized by software. For example, it is possible to implement the same functions as in the multicarrier communication apparatus of the present invention by describing algorithms of the CQI report methods according to the present invention using the programming language, and executing this program with an information processing section by storing in memory.

Each function block employed in the description of each of the aforementioned embodiments may typically be implemented as an LSI constituted by an integrated circuit. These may be individual chips or partially or totally contained on a single chip.

"LSI" is adopted here but this may also be referred to as "IC", "system LSI", "super LSI", or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The present application is based on Japanese Patent Application No. 2005-238952, filed on Aug. 19, 2005, the entire content of which is expressly incorporated by reference herein.

INDUSTRIAL APPLICABILITY

The multicarrier communication system, multicarrier communication apparatus and CQI report method according to the present invention are suitable for use in a communication terminal apparatus, base station apparatus and the like in a mobile communication system.

The invention claimed is:

1. A communication apparatus comprising:
a quality calculation section that calculates quality values of a plurality of resource blocks;
a channel quality indicator (CQI) selection section that selects one CQI group from among a plurality of CQI groups which are composed of a plurality of CQIs, and selects a CQI for each of the plurality of resource blocks from among the plurality of CQIs included in the selected CQI group, according to each of the calculated quality values of the plurality of resource blocks; and
a CQI generation section that generates a signal including CQI group information indicating the selected CQI group and CQI information indicating the selected CQI within the selected CQI group for each of the plurality of resource blocks,
wherein a first range between a first highest quality value and a first lowest quality value corresponding to CQIs in a first CQI group is different from a second range between a second highest quality value and a second lowest quality value corresponding to CQIs in a second CQI group, and
the first range of the first CQI group is wider than the second range of the second CQI group that is selected when the calculated quality values are lower than quality values for selecting the first CQI group.

2. A communication apparatus comprising:
a quality calculation section that calculates quality values of a plurality of resource blocks;
a channel quality indicator (CQI) selection section that selects one CQI group from among a plurality of CQI groups which are composed of a plurality of CQIs, and selects a CQI for each of the plurality of resource blocks from among the plurality of CQIs included in the selected CQI group, according to each of the calculated quality values of the plurality of resource blocks; and
a CQI generation section that generates a signal including CQI group information indicating the selected CQI group and CQI information indicating the selected CQI within the selected CQI group for each of the plurality of resource blocks,
wherein a first range between a first highest quality value and a first lowest quality value corresponding to CQIs in a first CQI group is different from a second range between a second highest quality value and a second lowest quality value corresponding to CQIs in a second CQI group, and
the first CQI group includes higher quality values and lower quality values having quality values lower than the higher quality values, the higher quality values and the lower quality values corresponding to CQIs in the first CQI group, and a first interval between the higher quality values is narrower than a second interval between the lower quality values, the first CQI group being selected when the calculated quality values are higher than quality values for selecting the second CQI group.

3. A communication apparatus comprising:
a quality calculation section that calculates quality values of a plurality of resource blocks;
a channel quality indicator (CQI) selection section that selects one CQI group from among a plurality of CQI groups which are composed of a plurality of CQIs, and selects a CQI for each of the plurality of resource blocks from among the plurality of CQIs included in the selected CQI group, according to each of the calculated quality values of the plurality of resource blocks; and a CQI generation section that generates a signal including CQI group information indicating the selected CQI group and CQI information indicating the selected CQI within the selected CQI group for each of the plurality of resource blocks, wherein a first range between a first highest quality value and a first lowest quality value corresponding to CQIs in a first CQI group is different from a second range between a second highest quality value and a second lowest quality value corresponding to CQIs in a second CQI group, and the CQI groups include first CQI groups and second CQI groups, a number of CQIs included in the first CQI groups is smaller than a number of CQIs included in the second CQI groups, and the channel quality indicator (CQI) selection section selects the one CQI group from among the first CQI groups when a number of report resource blocks is equal to or smaller than a predetermined threshold, and selects the one CQI group from among the second CQI groups when the number of report resource blocks is greater than the predetermined threshold.

4. A communication method performed by a communication apparatus, the communication method comprising:

calculating quality values of a plurality of resource blocks;

selecting one CQI group from among a plurality of CQI groups which are composed of a plurality of CQIs, and selecting a CQI for each of the plurality of resource blocks from among the plurality of CQIs included in the selected CQI group, according to each of the calculated quality values of the plurality of resource blocks; and generating a signal including CQI group information indicating the selected CQI group and CQI information indicating the selected CQI within the selected CQI group for each of the plurality of resource blocks, wherein a first range between a first highest quality value and a first lowest quality value corresponding to CQIs in a first CQI group is different from a second range between a second highest quality value and a second lowest quality value corresponding to CQIs in a second CQI group, and the first range of the first CQI group is wider than the second range of the second CQI group that is selected when the calculated quality values are lower than quality values for selecting the first CQI group.

5. A communication method performed by a communication apparatus, the communication method comprising:

calculating quality values of a plurality of resource blocks;

selecting one CQI group from among a plurality of CQI groups which are composed of a plurality of CQIs, and selecting a CQI for each of the plurality of resource blocks from among the plurality of CQIs included in the selected CQI group, according to each of the calculated quality values of the plurality of resource blocks; and generating a signal including CQI group information indicating the selected CQI group and CQI information indicating the selected CQI within the selected CQI group for each of the plurality of resource blocks, wherein a first range between a first highest quality value and a first lowest quality value corresponding to CQIs in a first CQI group is different from a second range between a second highest quality value and a second lowest quality value corresponding to CQIs in a second CQI group, and the first CQI group includes higher quality values and lower quality values having quality values lower than the higher quality values, the higher quality values and the lower quality values corresponding to CQIs in the first CQI group, and a first interval between the higher quality values is narrower than a second interval between the lower quality values, the first CQI group being selected when the calculated quality values are higher than quality values for selecting the second CQI group.

6. A communication method performed by a communication apparatus, the communication method comprising:

calculating quality values of a plurality of resource blocks;

selecting one CQI group from among a plurality of CQI groups which are composed of a plurality of CQIs, and selecting a CQI for each of the plurality of resource blocks from among the plurality of CQIs included in the selected CQI group, according to each of the calculated quality values of the plurality of resource blocks; and generating a signal including CQI group information indicating the selected CQI group and CQI information indicating the selected CQI within the selected CQI group for each of the plurality of resource blocks, wherein a first range between a first highest quality value and a first lowest quality value corresponding to CQIs in a first CQI group is different from a second range between a second highest quality value and a second lowest quality value corresponding to CQIs in a second CQI group, and the CQI groups includes a first CQI groups and a second CQI groups, a number of CQIs included in the first CQI groups is smaller than a number of CQIs included in the second CQI groups, and the selecting one CQI group includes selecting the one CQI group from among the first CQI groups when a number of report resource blocks is equal to or smaller than a predetermined threshold, and selects the one CQI group from among the second CQI groups when the number of report resource blocks is greater than the predetermined threshold.

* * * * *